(12) United States Patent
Turek et al.

(10) Patent No.: US 11,480,240 B2
(45) Date of Patent: Oct. 25, 2022

(54) STAMPED HUB FOR CAST PLASTIC

(71) Applicant: Steering Solutions IP Holding Corporation, Saginaw, MI (US)

(72) Inventors: Alan G. Turek, Mayville, MI (US); Brett M. Close, Reese, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/130,777

(22) Filed: Dec. 22, 2020

(65) Prior Publication Data
US 2021/0285532 A1    Sep. 16, 2021

Related U.S. Application Data

(60) Provisional application No. 62/988,197, filed on Mar. 11, 2020.

(51) Int. Cl.
*F16H 55/17* (2006.01)
*B22D 25/02* (2006.01)
*B21K 1/30* (2006.01)

(52) U.S. Cl.
CPC ............... *F16H 55/17* (2013.01); *B21K 1/30* (2013.01); *B22D 25/02* (2013.01)

(58) Field of Classification Search
CPC ..... F16H 2055/065; F16H 55/17; F16H 55/12
See application file for complete search history.

(56) References Cited

U.S. PATENT DOCUMENTS

| | | | | |
|---|---|---|---|---|
| 1,231,321 A | * | 6/1917 | Weaver | F16H 55/12 74/447 |
| 1,323,962 A | * | 12/1919 | Byers | F16H 55/12 74/448 |
| 1,648,550 A | * | 11/1927 | Kantor | F16H 55/12 74/448 |
| 2,516,365 A | * | 7/1950 | Carraher | F16H 55/06 74/445 |
| 2,932,207 A | * | 4/1960 | Whitney | F16H 55/30 474/152 |
| 3,100,333 A | | 8/1963 | Friend | |
| 3,168,836 A | * | 2/1965 | Militana | F16H 55/12 474/152 |
| 3,734,697 A | * | 5/1973 | Sieghartner | F04D 5/002 29/889.23 |
| 2004/0226170 A1 | * | 11/2004 | Prucher | F16D 1/10 29/893 |

(Continued)

FOREIGN PATENT DOCUMENTS

EP    1892430 B1    6/2010
JP    2006200622 A    8/2006

(Continued)

OTHER PUBLICATIONS

English translation of Official Letter regarding corresponding DE App. No. 102021103898.7; dated Apr. 27, 2022.

*Primary Examiner* — Terence Boes
(74) *Attorney, Agent, or Firm* — Dickinson Wright PLLC (57) ABSTRACT

A gear includes an inner hub formed of metal material, the inner hub having an outer surface defining a plurality of outer teeth. The gear also includes an outer ring formed of non-metal material, the outer ring having an inner diameter that is smooth. The outer ring is disposed in an interference fit with the outer teeth of the inner hub.

7 Claims, 9 Drawing Sheets

(56) References Cited

U.S. PATENT DOCUMENTS

2014/0083222 A1* 3/2014 Cleeves ................ F02B 75/282
74/421 R
2021/0172507 A1* 6/2021 Beyerlein .............. B29D 15/00

FOREIGN PATENT DOCUMENTS

WO          2011080824 A1    5/2013
WO    WO-2017141965 A1 *   8/2017  ............. F16H 55/22

* cited by examiner

STAMPED HUB FOR CAST PLASTIC

CROSS-REFERENCE TO RELATED APPLICATION

This application claims the benefit of priority to U.S. Provisional Application No. 62/988,197, filed Mar. 11, 2020, the disclosure of which is incorporated by reference herein in its entirety.

FIELD OF THE INVENTION

The present invention relates to a gear and, more particularly, to a gear comprising a stamped hub and a cast plastic.

BACKGROUND

Automobiles are the subject of many different types of stresses, such as rough driving surfaces, internal vibrations, and exposure to a broad range of environments. Various components of automobiles experience these hardships more than others and the malfunction of one component often leads to the damage of interrelated parts and abrupt automobile breakdown. While steel and other metallic materials are strong and durable, they are heavy and greatly reduce fuel economy. In attempts to balance strength and weight, traditional metallic components are being replaced or integrated with components made of non-metallic material, such as polymer or carbon-fiber based materials.

One example category of components that are of absolute criticality to the operation of an automobile are the numerous gears that translate motion between parts. Some gears include a metallic inner hub with a knurled outer diameter (O.D.) and a non-metallic outer ring cast around and bonded to the knurled O.D. While these gears that utilize an inner hub and an outer ring exhibit certain benefits over the more traditional gears in certain applications, problems may persist during operation. For example, the inner hub is heavy and negatively impacts fuel economy and the geometric shape of the knurled outer surface can lead to stress fractures and complete separation or peeling of the outer ring and hub during operation. One application in which these gears with an inner hub and an outer ring have been utilized is in power steering systems.

Accordingly, there is a continued desire to develop gears having an inner hub and an outer ring to minimize weight and reduce the occurrence of abrupt separation and non-operability.

SUMMARY OF THE DISCLOSURE

According to one aspect of the disclosure, a gear includes an inner hub formed of metal material, the inner hub having an outer surface defining a plurality of outer teeth. The gear also includes an outer ring formed of non-metal material, the outer ring having an inner diameter that is smooth. The outer ring is disposed in an interference fit with the outer teeth of the inner hub.

According to another aspect of the disclosure, a method of forming a gear is provided. The method includes forming an inner hub from a metal material and defining a plurality of outer teeth on an outer diameter of the inner hub. The method also includes forming an outer ring formed of non-metal material and defining a smooth inner diameter of the outer ring. The method further includes interference fitting the smooth inner diameter of the outer ring to the outer teeth of the inner hub.

According to yet another aspect of the disclosure, a gear includes an inner hub formed of stamped metal material, the inner hub having an outer surface defining a plurality of outer teeth, wherein at least some of the plurality of outer teeth have a pair of outer tooth sidewalls and an outer tooth top wall, each of the pair of outer tooth sidewalls extending perpendicularly from the outer surface of the inner hub, wherein the outer tooth top wall is oriented at a right angle to the pair of outer tooth sidewalls and connects the pair of outer tooth sidewalls. The gear also includes an outer ring formed of non-metal material, the outer ring having an inner diameter that is smooth. The outer ring is disposed in an interference fit with the inner teeth.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The Figures described herein are for illustrative purposes only of selected embodiments and are not intended to limit the scope of the present disclosure. The inventive concepts associated with the present disclosure will be more readily understood by reference to the following description in combination with the accompanying drawings wherein.

DETAILED DESCRIPTION

Example embodiments will now be described more fully with reference to the accompanying drawings. In general, the subject embodiments are directed to a gear having an inner hub and an outer ring. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that some specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, wherein like numerals indicate corresponding parts throughout the views, the subject gear is intended for providing an enhanced structure that is lighter by design and less prone to the breakage and delamination that has beset previous renditions.

Figure 1:
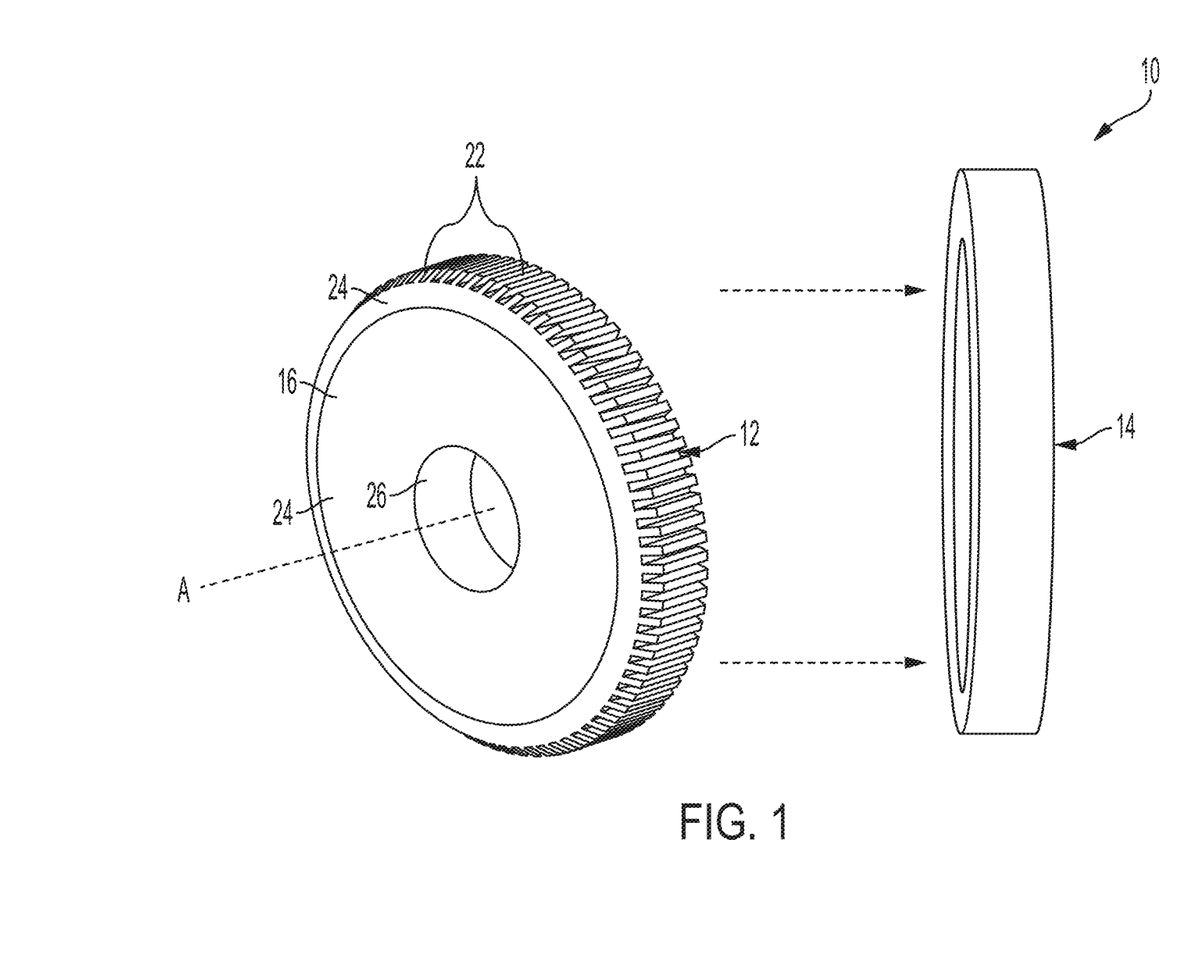
FIG. 1 is a perspective disassembled view of a gear that includes an inner hub and an outer sleeve.
Figure 2:
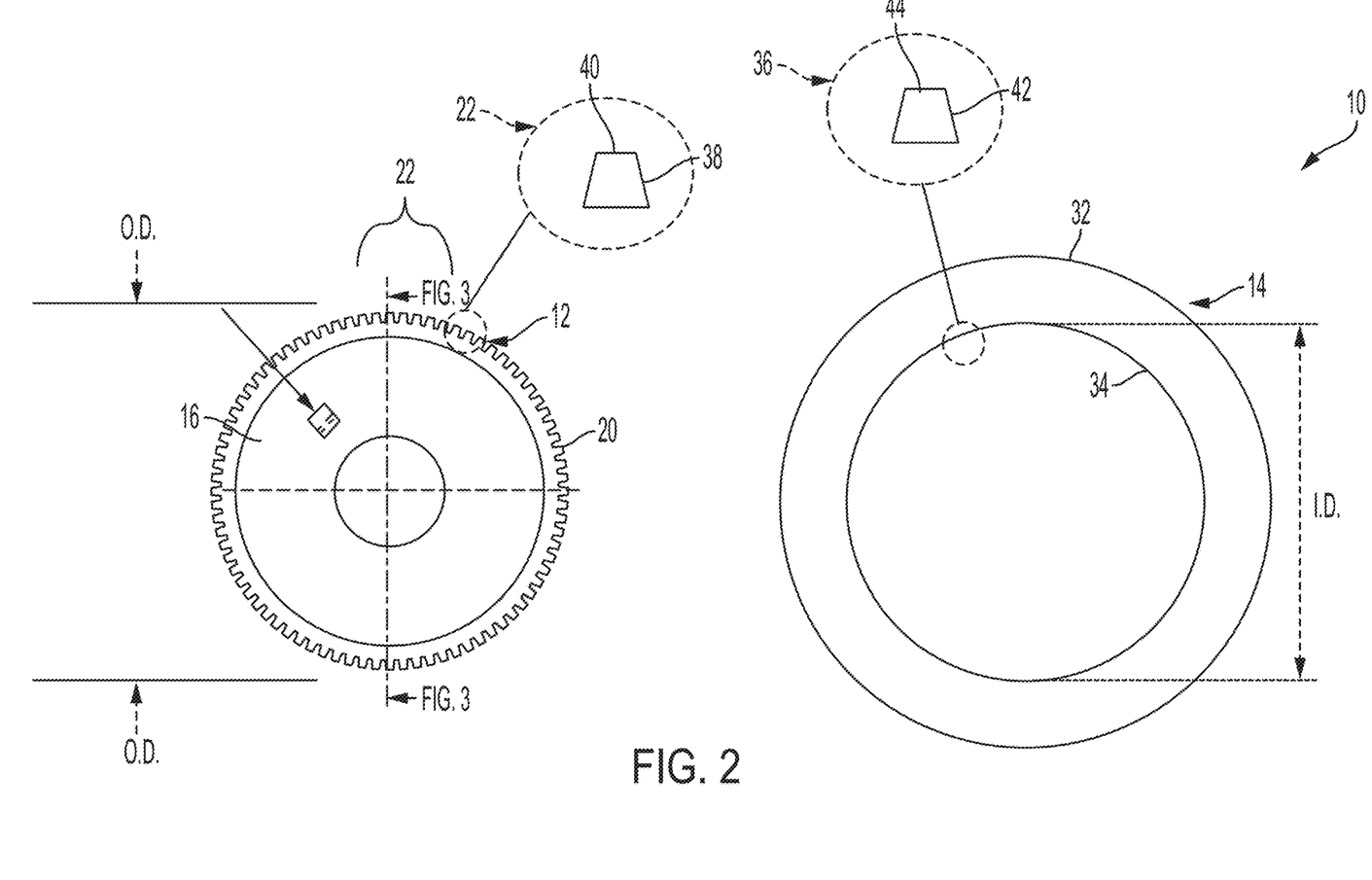
FIG. 2 is a plan view of the inner hub and outer ring illustrating that the inner hub includes an outer diameter (O.D.) with a series of teeth extending from the O.D.
Figure 3:
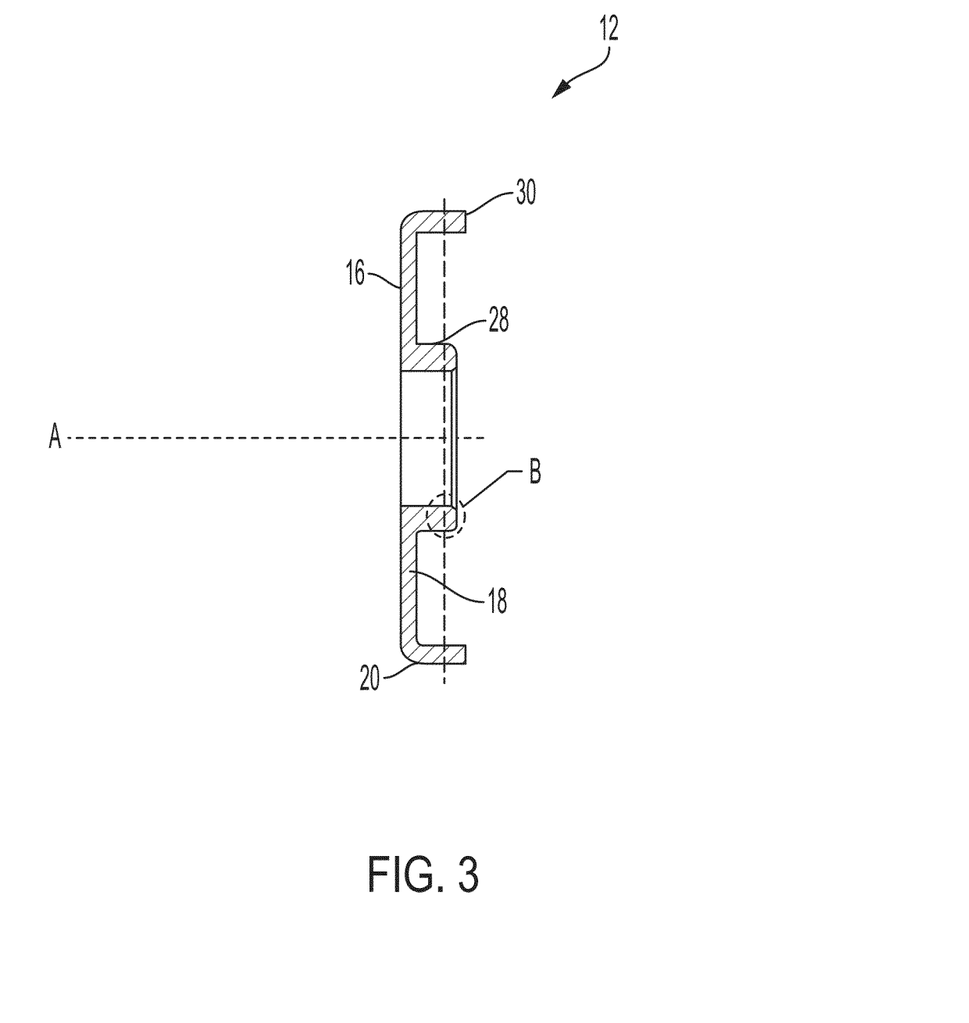
FIG. 3 is a cross sectional view of the inner hub illustrating that the hub includes a front face and a rear face.

Referring initially to FIGS. 1 through 3, a gear 10 in a disassembled condition is depicted. The gear 10 includes an inner hub 12 and an outer ring 14. The inner hub 12 includes a front face 16 and a rear face 18 that extend about an axis A to define an outer diameter (O.D.). An outer diameter surface 20 spaces the front face 16 and rear face 18. A series of outer teeth 22 are circumferentially spaced around the axis A on the outer diameter surface 20 and extend between the front face 16 and the rear face 18. The front face 16 and rear face 18 define a tapered section 24 adjacent to the outer teeth 22 and a flat section 16 that extends radially inwardly from the tapered section 24 to a shaft connection aperture 26. As best shown in FIG. 3, the shaft connection aperture 26 includes an inner sleeve portion 28 that extends axially. The outer teeth 22 are located on an outer sleeve portion 30 that extends axially. The inner hub 12 is formed of metal material, for example, the inner hub 12 may be stamped from a steel material. Alternatively, the inner hub 12 may be formed by other methodologies such as casting, forging, machining from solid, etc. The outer ring 14 includes an outer surface 32 that extends radially inwardly to an inner diameter surface 34 that includes an inner diameter (I.D.) that is sized for an interference fit to interface with the outer diameter surface 20 of inner hub 12. The inner diameter surface 34 is a smooth/flat surface. The outer ring 14 may be formed of a second material that is not metal, for example, the outer ring 14 may be casted, extruded or molded from a polymer or, more particularly, a nylon material. The outer teeth 22 each include outer teeth sidewalls 38 that extend radially outwardly to an outer teeth top wall 40.

Figure 4A:
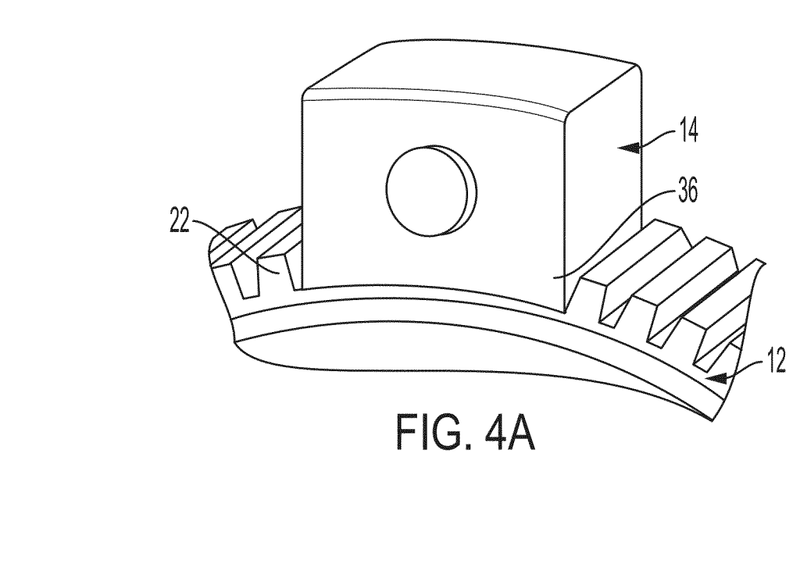
FIGS. 4A through 4E are a series of perspective views illustrating various types of teeth that may be utilized in accordance with the subject disclosure.

Referring now to FIGS. 4A through 4E, a series of perspective views are provided that illustrate various types of teeth that may be utilized in accordance with the subject disclosure. In FIG. 4A, the inner hub 12 is formed of solid steel that has not been stamped. The outer teeth 22 of the inner hub 12 each includes outer teeth sidewalls 38 that are tapered towards the outer teeth top wall 40. The taper may be along the entire or only part of the radial extension of the outer teeth sidewall 38.

Figure 4B:
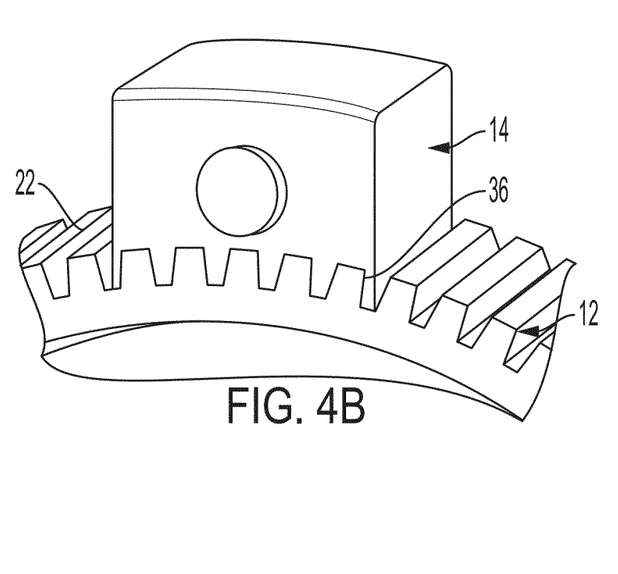

In FIG. 4B, the inner hub 12 is formed of steel that has been stamped. The outer teeth 22 of the inner hub 12 each includes outer teeth sidewalls 38 that are tapered towards the outer teeth top wall 40. The taper extends along only part of the radial extension of the outer teeth sidewall 38 such that it is partially tapered. The inner surface 34 of the outer ring 14 is smooth and is an interference fit with the OD of hub 12.

Figure 4C:
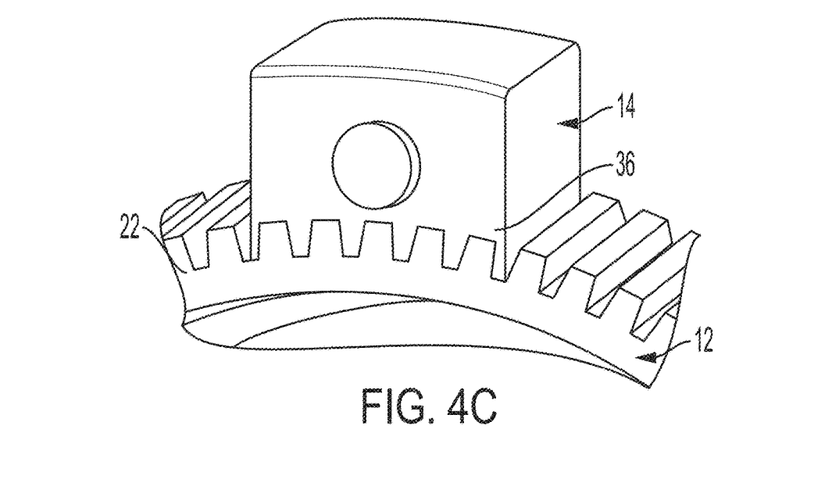

In FIG. 4C, the inner hub 12 is formed of steel that has been stamped. The outer teeth 22 of the inner hub 12 each includes outer teeth sidewalls 38 that are tapered towards the outer teeth top wall 40. The taper extends along the entire radial extension of the outer teeth sidewall 38 such that it is fully tapered. The inner surface 34 of the outer ring 14 is smooth and is an interference fit with the OD of hub 12.

Figure 4D:
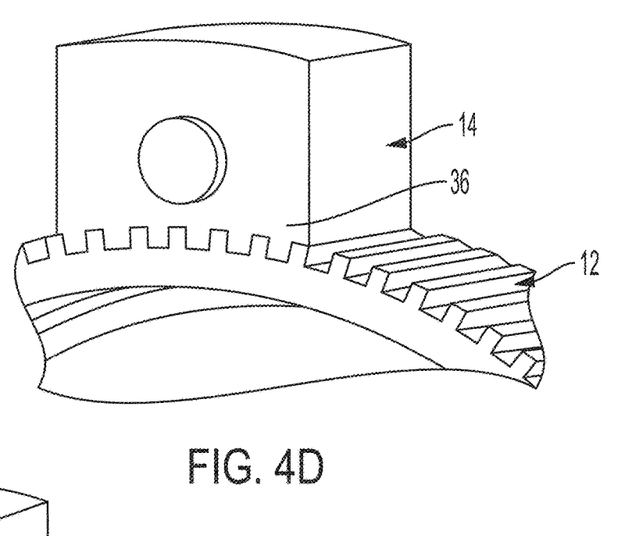

In FIG. 4D, the inner hub 12 is formed of steel that has been stamped. The outer teeth 22 of the inner hub 12 each includes outer teeth sidewalls 38 that are not tapered towards the outer teeth top wall 40. The outer teeth sidewalls 38 are straight and parallel and each form a right angle with the outer teeth top wall 40 such that the teeth are generally rectilinear. The inner surface 34 of the outer ring 14 is smooth and is an interference fit with the OD of hub 12.

Figure 4E:
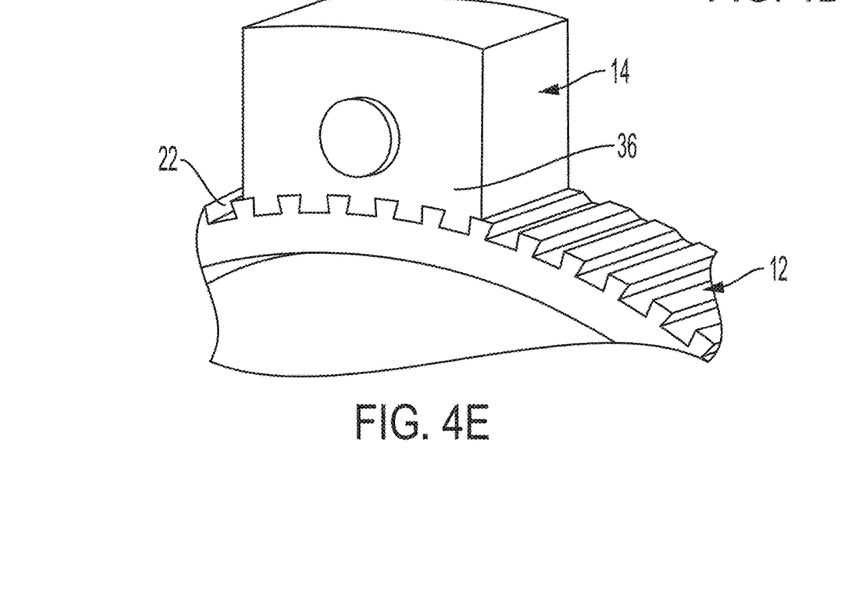

In FIG. 4E, the inner hub 12 is formed of steel that has been stamped. The outer teeth 22 of the inner hub 12 each includes outer teeth sidewalls 38 that are tapered away from the outer teeth top wall 40. The taper extends along all or only part of the radial extension of the outer teeth sidewall 38 such that the outer teeth 22 each form a dovetail. The inner surface 34 of the outer ring 14 is smooth and is an interference fit with the OD of hub 12.

Figure 5A:
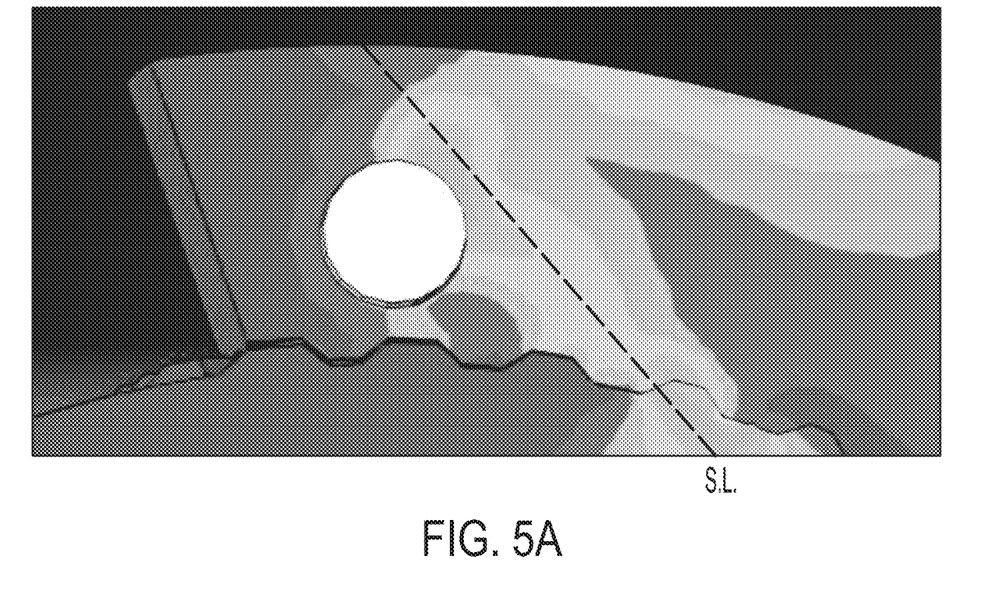
FIG. 5A provides a perspective view illustrating the stress distribution on the gear wherein the inner hub is knurled.

FIG. 5A provides a perspective view illustrating the stress distribution on the gear wherein the inner hub is knurled. The stress distribution is shown in greyscale wherein it should be appreciated that the stress distribution forms a relatively straight stress line (S.L.) demonstrating a propensity of the outer ring 14 to separate from the inner hub 12 due to concentration of the stress at the interface.

Figure 5B:
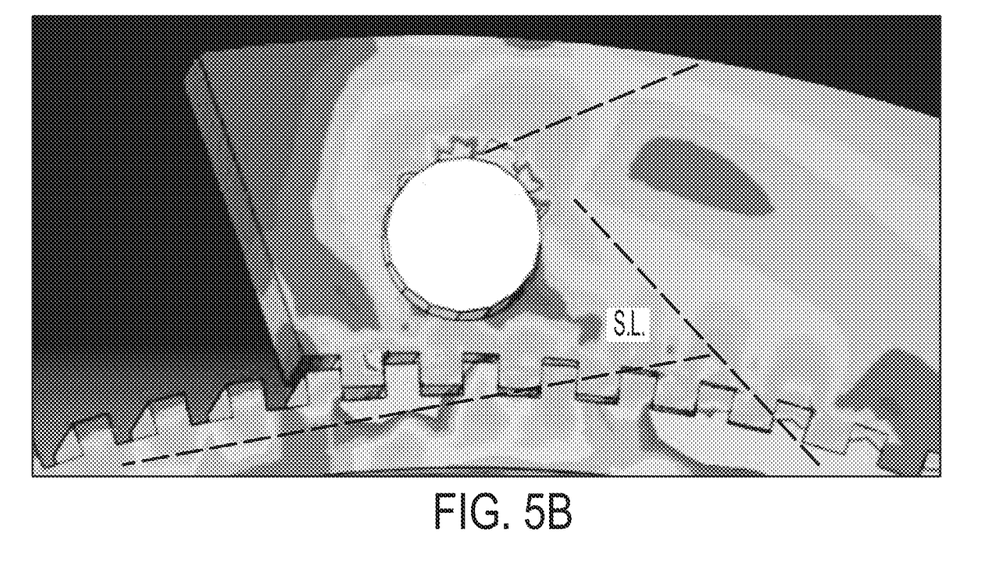
FIG. 5B provides a perspective view illustrating the stress distribution on the gear wherein the inner hub is toothed.

FIG. 5B provides a perspective view illustrating the stress distribution on the gear wherein the inner hub is toothed. The stress distribution is again shown in greyscale wherein it should be appreciated that the stress distribution forms a branched out series of stress lines (S.L.) demonstrating a reduced propensity of the outer ring 14 to separate from inner hub 12 due to an increased stress distribution at the interface. In instances where there is crack through outer ring 14 to the surface of inner hub 12, instead of complete and abrupt separation, there may be a period of operation wherein the operation is "sticky" and indicates that a replacement is necessary.

Figure 6A:
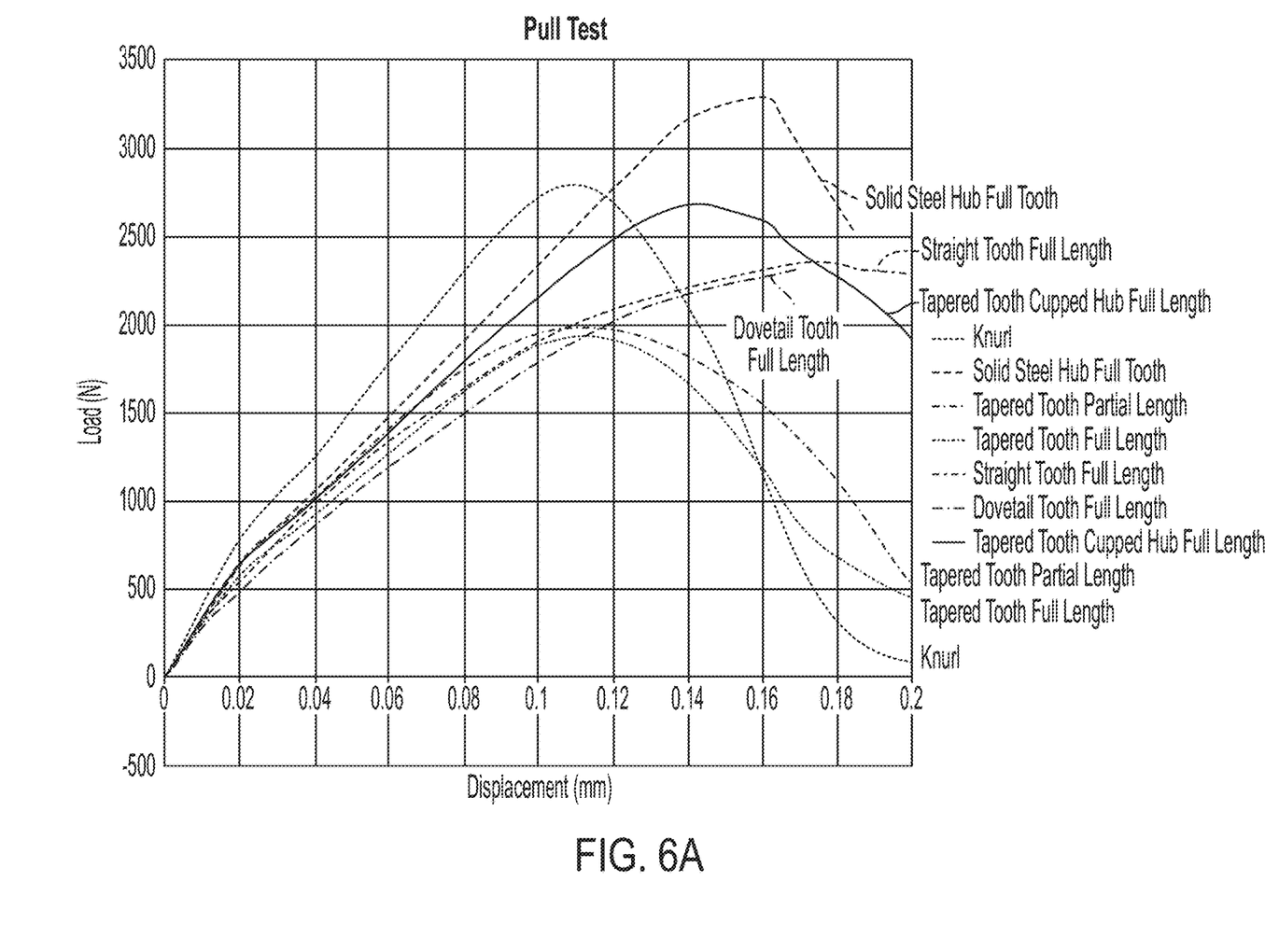
FIG. 6A graphically illustrates results of a pull test as a function of displacement and load.

FIG. 6A graphically illustrates results of a pull test as a function of displacement and load in greyscale. The graph includes results of the pull test conducted on the various types of teeth illustrated in FIGS. 4A through 4E and also includes test results wherein the teeth are replaced with a knurled surface. It should be appreciated that a greater displacement results from a smaller load in the knurled surface whereas the various teeth exhibit greater loads maintained under larger displacements.

Figure 6B:
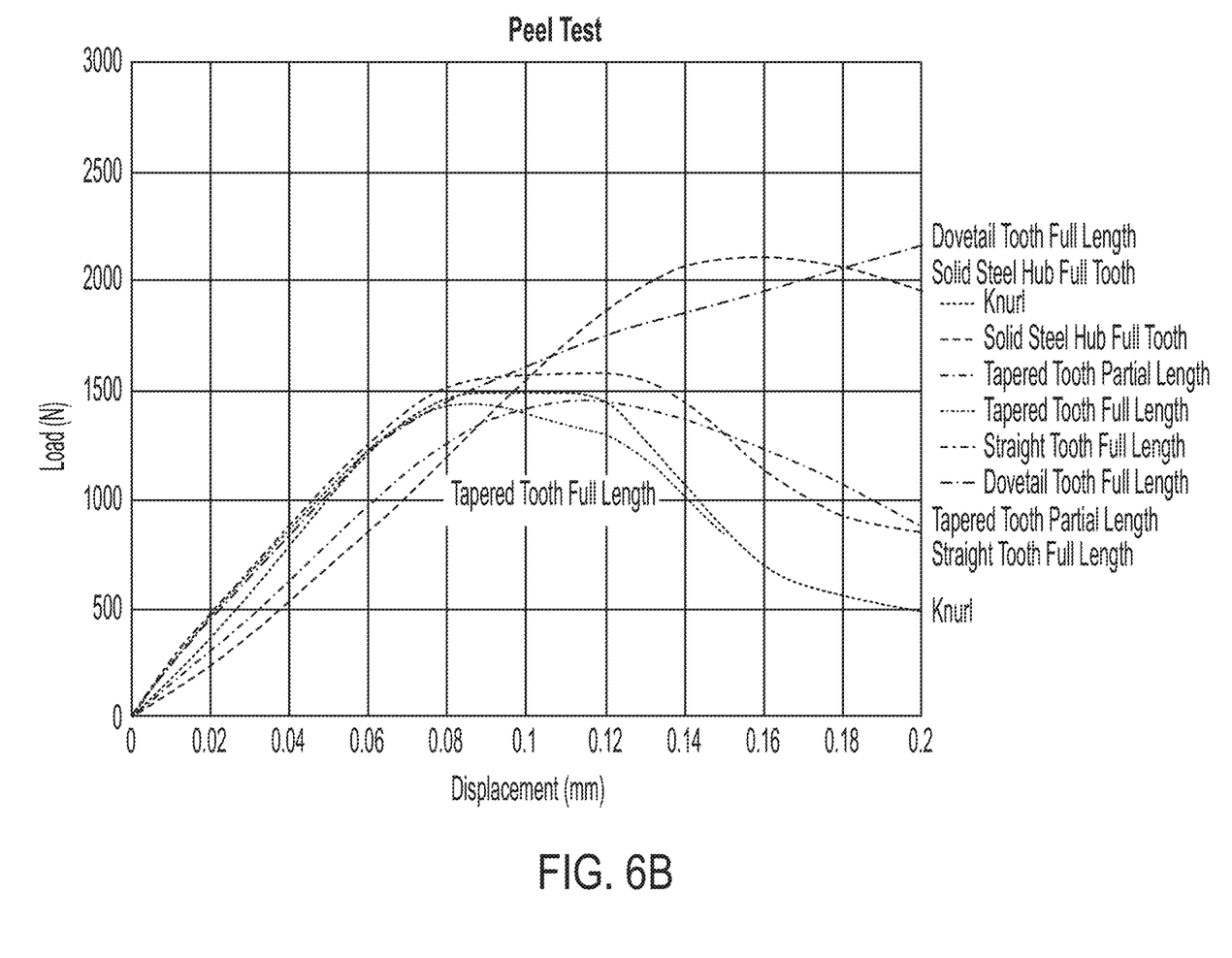
FIG. 6B graphically illustrates results of a peel test as a function of displacement and load.

FIG. 6B graphically illustrates results of a peel test as a function of displacement and load in greyscale. The graph includes results of the peel test conducted on the various types of teeth illustrated in FIGS. 4A through 4E and also includes test results wherein the teeth are replaced with a knurled surface. It should be appreciated that a smaller load results from a larger displacement in the knurled surface whereas the straight teeth and dovetailed teeth maintain a higher load under larger displacements. It should be appreciated the increased peak load of the straight and dovetail tooth surface.

Figure 7:
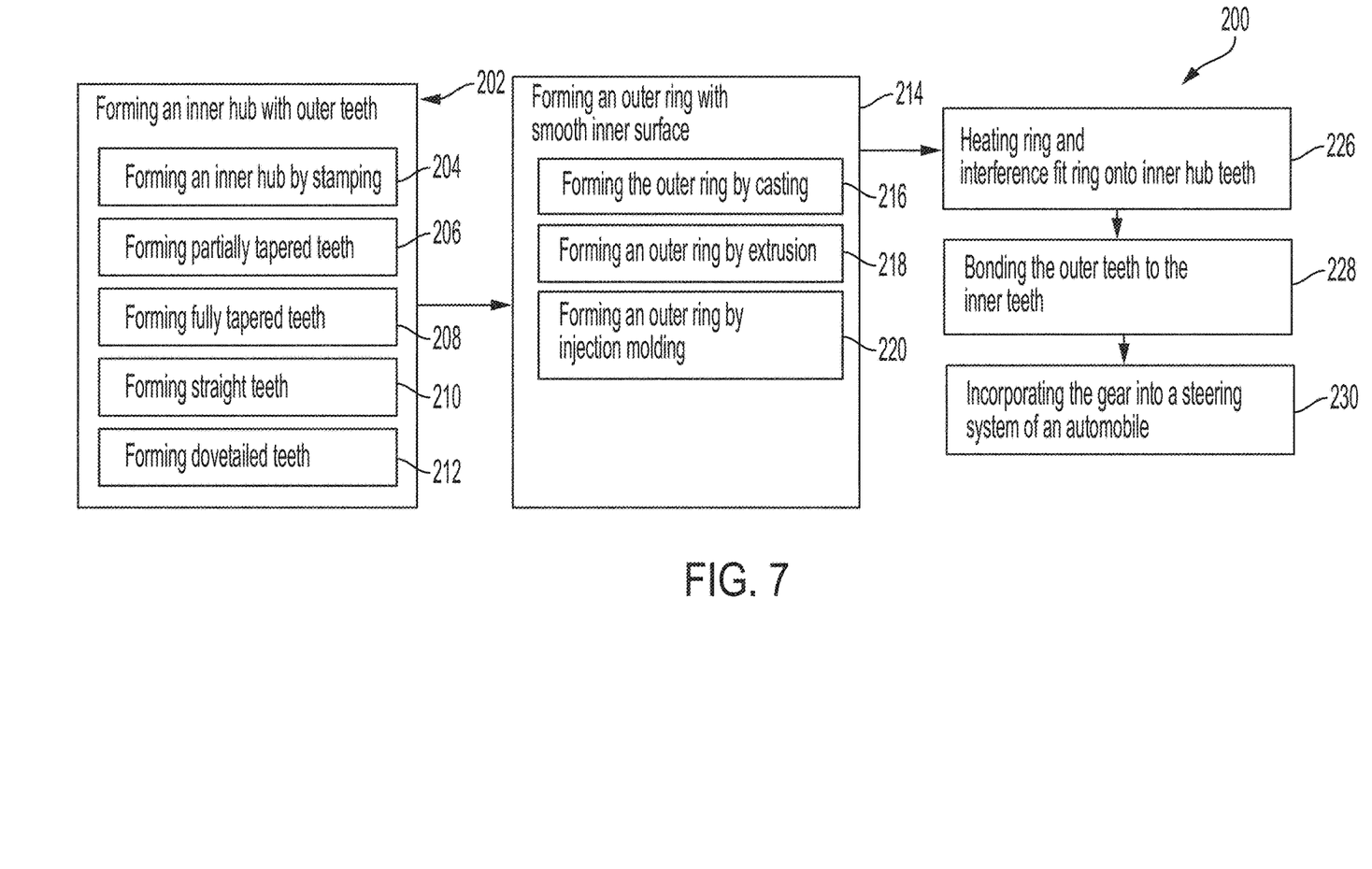
FIG. 7 is a flow chart for a method of forming a gear with an inner hub and an outer ring.

FIG. 7 is a flow chart for a method 200 of forming a gear with an inner hub and an outer ring. The method 200 includes forming an inner hub with outer teeth 202. Step 202 may include forming the inner hub by stamping, forging, casting, machining, etc. 204, forming partially tapered teeth 206, forming fully tapered teeth 208, forming straight teeth 210, and/or forming dovetailed teeth 212. The method 200 continues by forming an outer ring with a smooth ID 214. Step 214 may include forming the outer ring by casting 216, extrusion 218, or by injection molding 220. The method 200 continues with heating the outer ring 14 up and pressing it onto the inner hub 12 226, induction heating the inner hub 12 to melt the plastic ID surface of outer ring 14 so it flows into the teeth of the inner hub 12 and bonding the plastic ring to the hub teeth 228 (for example via adhesives or heat application), and incorporating the gear into a steering system of an automobile (for example an electronic power steering system) 230.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A gear comprising:
    an inner hub formed of metal material, the inner hub having an outer surface defining a plurality of outer teeth;
    an outer ring formed of non-metal material, the outer ring having an inner diameter that is smooth; and
    wherein the outer ring is disposed in an interference fit with the outer teeth of the inner hub,
    wherein at least some of the plurality of outer teeth have a pair of outer tooth sidewalls and an outer tooth top wall, each of the pair of outer tooth sidewalls extending away from the outer surface of the inner hub in a straight plane along an entirety thereof and parallel to each other, wherein the outer tooth top wall is oriented at a right angle to the pair of outer tooth sidewalls and connects the pair of outer tooth sidewalls.

2. The gear of claim 1, wherein all of the plurality of outer teeth have a pair of outer tooth sidewalls and an outer tooth top wall, each of the pair of outer tooth sidewalls extending away from the outer surface of the inner hub in a straight plane along an entirety thereof and parallel to each other, wherein the outer tooth top wall is oriented at a right angle to the pair of outer tooth sidewalls and connects the pair of outer tooth sidewalls.

3. The gear of claim 1, wherein the inner hub is a stamped metal component.

4. The gear of claim 1, wherein the inner hub is a cast component.

5. The gear of claim 1, wherein the inner hub is a forged component.

6. The gear of claim 1, wherein the inner hub is machined from a solid blank.

7. A gear comprising:
    an inner hub formed of stamped metal material, the inner hub having an outer surface defining a plurality of outer teeth, wherein at least some of the plurality of outer teeth have a pair of outer tooth sidewalls and an outer tooth top wall, each of the pair of outer tooth sidewalls extending away from the outer surface of the inner hub in a straight plane along an entirety thereof and parallel to each other, wherein the outer tooth top wall is oriented at a right angle to the pair of outer tooth sidewalls and connects the pair of outer tooth sidewalls;
    an outer ring formed of non-metal material, the outer ring having an inner diameter that is smooth; and
    wherein the outer ring is disposed in an interference fit with the inner teeth.

\* \* \* \* \*